United States Patent
Almasi et al.

(10) Patent No.: US 7,716,407 B2
(45) Date of Patent: May 11, 2010

(54) EXECUTING APPLICATION FUNCTION CALLS IN RESPONSE TO AN INTERRUPT

(75) Inventors: Gheorghe Almasi, Ardsley, NY (US); Charles J. Archer, Rochester, MN (US); Mark E. Giampapa, Irvington, NY (US); Thomas M. Gooding, Rochester, MN (US); Philip Heidelberger, Cortlandt Manor, NY (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 11/968,720

(22) Filed: Jan. 3, 2008

(65) Prior Publication Data

US 2009/0177828 A1 Jul. 9, 2009

(51) Int. Cl.
G06F 13/24 (2006.01)

(52) U.S. Cl. ...................... 710/260; 710/104

(58) Field of Classification Search ......... 710/260–269, 710/104
See application file for complete search history.

(56) References Cited

U.S. PATENT DOCUMENTS 5,469,571 A * 11/1995 Bunnell .................. 718/103

* cited by examiner

Primary Examiner—Paul R Myers
Assistant Examiner—Kim T Huynh
(74) Attorney, Agent, or Firm—Biggers & Ohanian, LLP

(57) ABSTRACT

Executing application function calls in response to an interrupt including creating a thread; receiving an interrupt having an interrupt type; determining whether a value of a semaphore represents that interrupts are disabled; if the value of the semaphore represents that interrupts are not disabled: calling, by the thread, one or more preconfigured functions in dependence upon the interrupt type of the interrupt; yielding the thread; and if the value of the semaphore represents that interrupts are disabled: setting the value of the semaphore to represent to a kernel that interrupts are hard-disabled; and hard-disabling interrupts at the kernel.

20 Claims, 7 Drawing Sheets

EXECUTING APPLICATION FUNCTION CALLS IN RESPONSE TO AN INTERRUPT

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for executing application function calls in response to an interrupt.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Any compute node in a parallel computer may be configured with an application for execution. For system stability and security, however, some portion of the functionality of each compute node and the parallel computer as a whole may be inaccessible directly by an application executing on a compute node. In some cases, for example, applications may not directly access the interrupt functionality of the compute node on which the application is executing. For some applications, however, directly accessing the interrupt functionality of a compute node may be useful. In addition, some applications executing on a compute node may have a portion of code that should not be interrupted when executing. In a parallel computer with many thousands of compute nodes, however, it is possible that an interrupt may occur during the execution of that portion of code that should not be interrupted when executing.

SUMMARY OF THE INVENTION

Methods, apparatus, and products for executing application function calls in response to an interrupt are disclosed that include creating a thread, receiving an interrupt having an interrupt type, and determining whether a value of a semaphore represents that interrupts are disabled. If the value of the semaphore represents that interrupts are not disabled the methods, apparatus, and products also include calling, by the thread, one or more preconfigured functions in dependence upon the interrupt type of the interrupt and yielding the thread. If the value of the semaphore represents that interrupts are disabled the methods, apparatus, and products also include setting the value of the semaphore to represent to a kernel that interrupts are hard-disabled and hard-disabling interrupts at the kernel.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
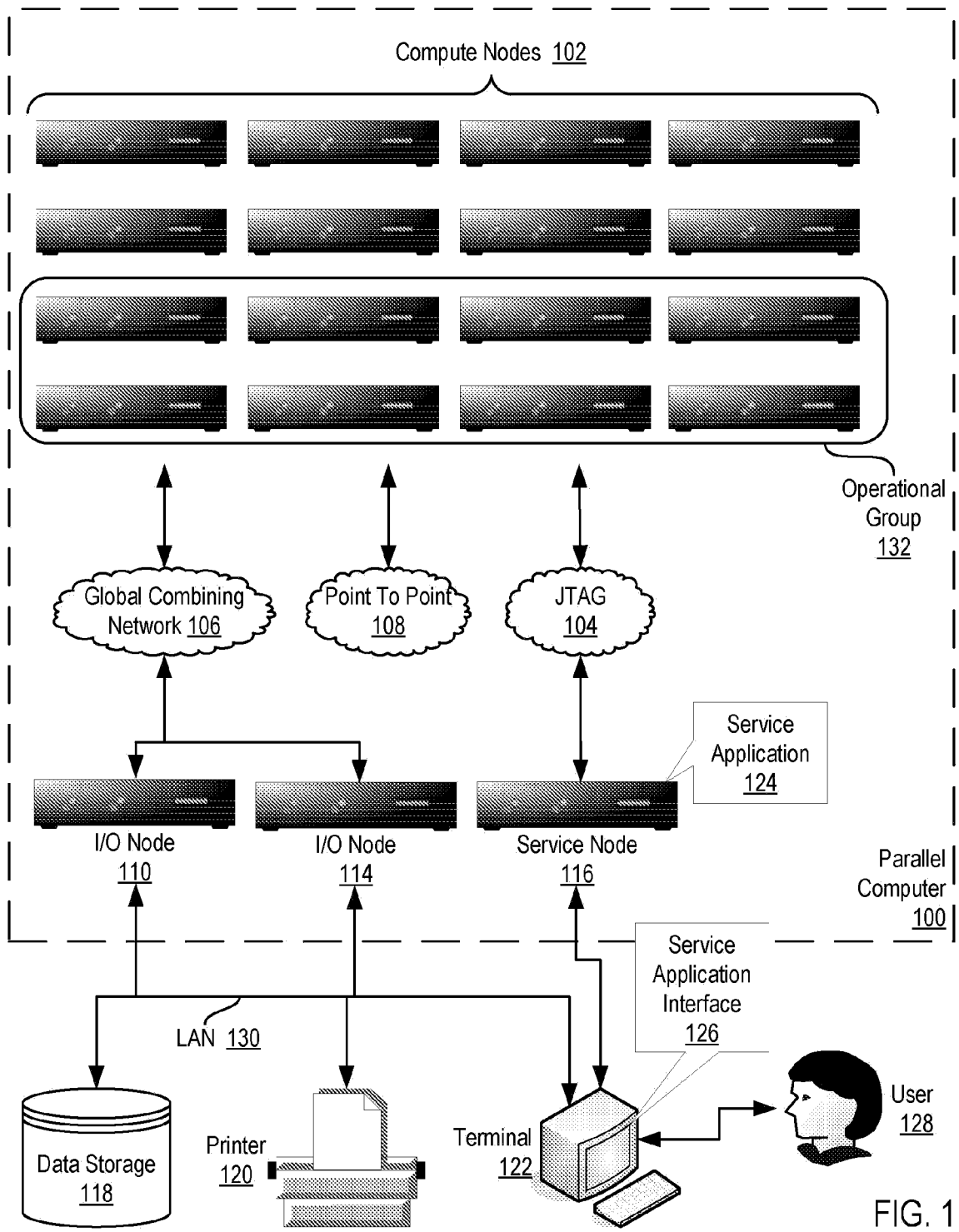
FIG. 1 illustrates an exemplary system for executing application function calls in response to an interrupt according to embodiments of the present invention.

Exemplary methods, apparatus, and products for executing application function calls in response to an interrupt in accordance with embodiments of the present invention are described with reference to the accompanying drawings, beginning with FIG. 1. FIG. 1 illustrates an exemplary system for executing application function calls in response to an interrupt according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for executing application function calls in response to an interrupt according to embodiments of the present invention. Any compute node or group of compute nodes in the system of FIG. 1 may be configured to operate for executing application function calls in response to an interrupt according to embodiments of the present invention. The system of FIG. 1 operates generally for executing application function calls in response to an interrupt according to embodiments of the present invention by creating a thread, receiving an interrupt having an interrupt type, and determining whether a value of a semaphore represents that interrupts are disabled. If the value of the semaphore represents that interrupts are not disabled, the system of FIG. 1 operates for executing application function calls in response to an interrupt by calling, by the thread, one or more preconfigured functions in dependence upon the interrupt type of the interrupt and yielding the thread. If the value of the semaphore represents that interrupts are disabled, the system of FIG. 1 operates for executing application function calls in response to an interrupt by setting the value of the semaphore to represent to a kernel that interrupts are hard-disabled and hard-disabling interrupts at the kernel.

A thread is independent flow of control that operates within the same address space as other independent flows of control within an application. Threads allow an application to fork or split into two or more simultaneously or pseudo-simultaneously running tasks. Threads are often used in concurrent computing. Concurrent computing is the concurrent or simultaneous execution of multiple interacting computational tasks. These tasks may be implemented as separate applications, or a set of processes or threads created by a single application. The tasks in concurrent computing may execute on a single processor, multiple processors in close proximity, or on processors distributed across a network.

An interrupt is an asynchronous signal from hardware indicated a need for an action to be taken. In typical systems a hardware interrupt causes a processor to save its state of execution via a context switch, and begin execution of an interrupt handler. In systems for executing application function calls in response to an interrupt according to embodiments of the present invention, an interrupt handler may execute the created thread in response to an interrupt.

A context switch is a computing process that typically includes storing and restoring the state or context of a processor such that multiple processes or threads can share a single processor resource. Use of context switches is common in a multitasking operating system. Context switches are usually computationally intensive. A context switch typically may refer to any of the following: a register context switch, a task context switch, a thread context switch, or a process context switch.

An interrupt type is a kind of interrupt. An interrupt type, for example, may be an identification of the origin of the interrupt. An interrupt type may, for example, identify an interrupt as originating from the Direct Memory Access subsystem of a compute node. When such a DMA-type interrupt occurs, an interrupt handler may execute a created thread that is associated with DMA-type interrupts.

A semaphore is a protected variable or abstract data type that is typically used for restricting access to shared resources such as storage. Such restriction using a semaphore is called mutual exclusion. Mutual exclusion ('mutex') algorithms are used in concurrent computing to avoid the simultaneous use of a common resource, such as a global variable, by pieces of computer code called critical sections. Examples of such resources include fine-grained flags, counters or queues, used to communicate between code that runs concurrently, such as an application and its interrupt handlers.

In systems for executing application function calls in response to an interrupt in accordance with embodiments of the present invention critical sections in an application identify a portion of code, the execution of which must not be interrupted by an interrupt. Such an interruption of the critical section may cause the propagation of errors in cases where, for example, the critical section accesses a shared resource, such as a data structure or device, which must not be concurrently accessed by more than one thread of execution.

Semaphores used to restrict access to a shared resource may be accessed in mutual exclusion algorithms by using atomic operations. Atomic operations refer to a set of operations that can be combined so that the operations appear to the rest of the system to be a single operation with only two possible outcomes: success or failure. To accomplish this, two conditions must be met:

Until the entire set of operations completes, no other process can be aware of the changes being made; and If any of the operations fail, the entire set of operations fails, and the state of the system is restored to the state it was in before any of the operations began.

Consider, as an example, a single process running on a computer that increments a value stored in a memory location. Incrementing the value in a memory location may be implemented as an atomic operation that includes three steps. To increment a memory location the process reads the value in the memory location, adds one to the value, and writes the new value back into the memory location. Implementing the incrementing of a value in a memory location as an atomic operation may be useful if the memory location is a shared memory location. If a first process, for example, reads a value in a shared memory location, adds one to the value, but is interrupted by second process before storing the new value in the shared memory location, the value accessed by the second process is incorrect.

The arrangement of nodes, networks, and I/O devices making up the exemplary system illustrated in FIG. 1 are for explanation only, not for limitation of the present invention. Data processing systems capable of executing application function calls in response to an interrupt according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of executing application function calls in response to an interrupt according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Readers will note that the description above of executing application function calls in response to an interrupt according to embodiments of the present invention using a node in a parallel computer is for explanation and not for limitation. In fact, executing application function calls in response to an interrupt according to embodiments of the present invention may be carried out in any computer system as will occur to those of skill in the art.

Executing application function calls in response to an interrupt according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of executing application function calls in response to an interrupt according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application program (158) may include one or more critical sections of code. As mentioned above, a critical section is a portion of code, the execution of which must not be interrupted by an interrupt.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
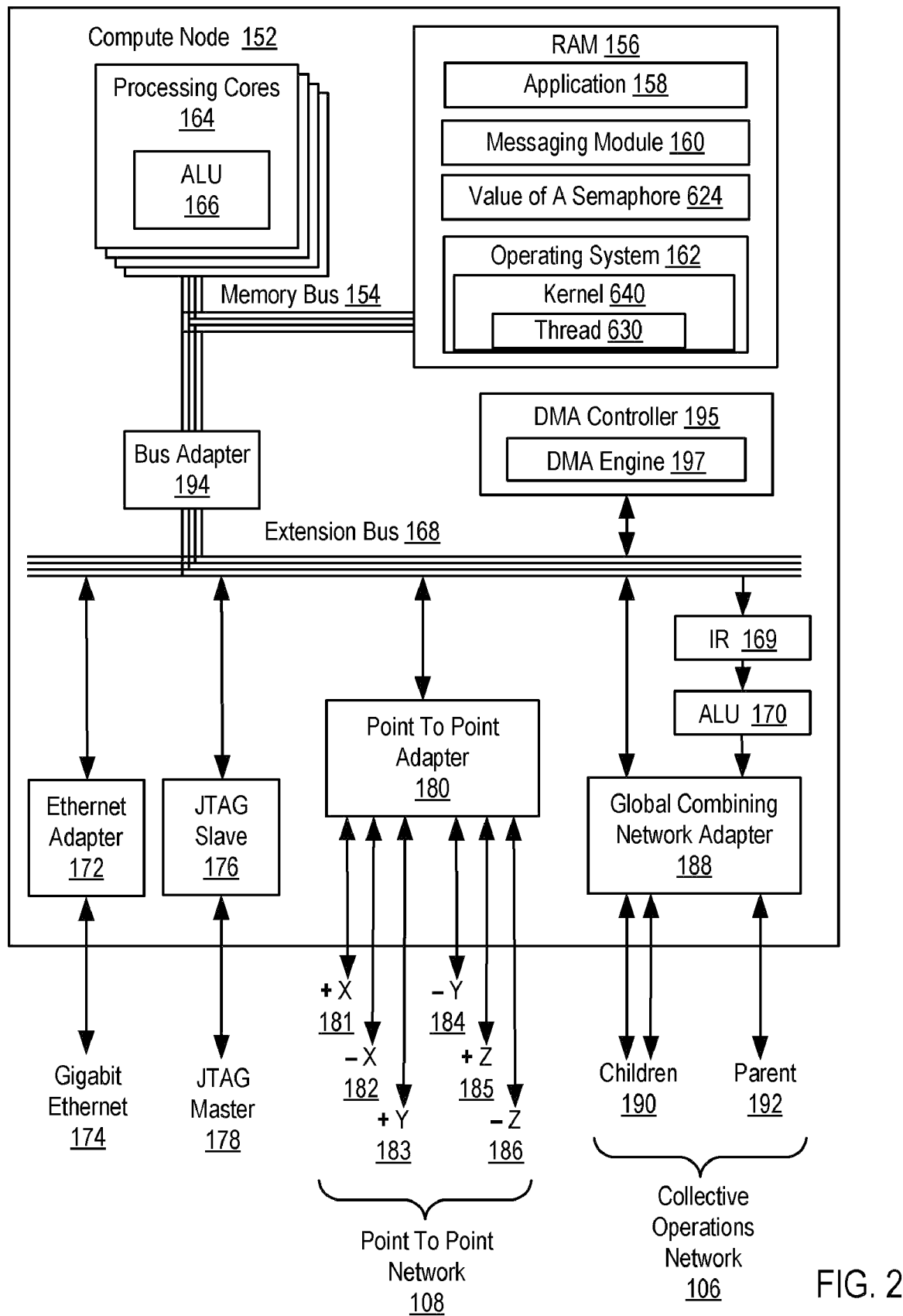
FIG. 2 sets forth a block diagram of an exemplary compute node useful in a parallel computer capable of executing application function calls in response to an interrupt according to embodiments of the present invention.

The operating system (156) of FIG. 2 includes a kernel (640). A kernel is the central module of computer program instructions of the operating system. A kernel's responsibilities may include managing the system's resources including the communication between hardware and software components. A kernel typically provides the lowest-level abstraction layer for resources including memory, processors, and I/O devices that application software must control during its operation. The kernel typically makes the low-level abstractions for resources available as application processes through inter-process communication mechanisms and system calls.

In addition to other responsibilities the kernel (640) may also schedule the execution of threads. Threads may be scheduled using one of many scheduling policies including for example:

A first-in first-out ('FIFO') scheduling policy, with fixed priority.

A round-robin ('RR') scheduling policy, quantum based and with fixed priority.

A default scheduling policy, a non-quantum based round-robin scheduling with fluctuating priority. Priority is modified according to the CPU usage of the thread.

Others as will occur to those of skill in the art.

The kernel (640) of FIG. 2 operates generally for executing application function calls in response to an interrupt according to embodiments of the present invention. The kernel (640) includes computer program instructions capable of creating a thread (630); receiving an interrupt having an interrupt type; and determining whether a value (624) of a semaphore represents that interrupts are disabled. If the value (624) of the semaphore represents that interrupts are not disabled, the kernel (640) also includes computer program instructions capable of calling, by the thread (630), one or more preconfigured functions in dependence upon the interrupt type of the interrupt and yielding the thread (630). The application (158) of FIG. 2 also operates generally for executing application function calls in response to an interrupt according to embodiments of the present invention. If the value (624) of the semaphore represents that interrupts are disabled the application (158) includes computer program instructions capable of setting the value (624) of the semaphore to represent to a kernel (640) that interrupts are hard-disabled and hard-disabling interrupts at the kernel (640).

The value of the semaphore may at any given time represent one of three things:
That interrupts are not disabled.
That interrupts are disabled.
That interrupts are hard-disabled.

If a value of a semaphore represents that interrupts are disabled, the application has entered a critical section, but the kernel has not received an interrupt. If a value of a semaphore represent that interrupts are hard-disabled, in contrast, the application has entered a critical section, the kernel has received an interrupt during the execution of the critical section, and upon receiving such an interrupt, a system call is sent to physically disable interrupts at the system level. Once the application exits the critical section the value of the semaphore is set to represent that interrupts are not disabled by using a system.

In many cases, a kernel may not receive an interrupt during execution of a critical section. Because hard-disabling interrupts at the system level requires a system call, hard-enabling interrupts at the system level also requires a system call, and in many cases, no interrupt will be received, using the value of a semaphore to represent that interrupts are disabled results in a lightweight, low-latency disabling of interrupts in many cases. That is, in many cases no system call will be required, but the critical section of the application will still be protected from interrupts.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for executing application function calls in response to an interrupt according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing application function calls in response to an interrupt according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
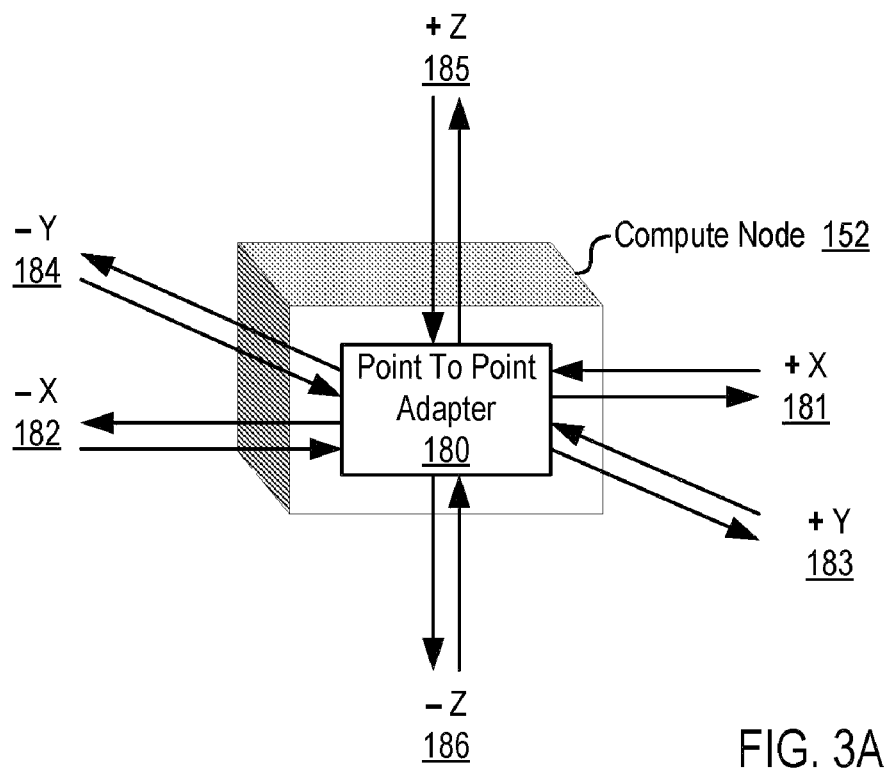
FIG. 3A illustrates an exemplary Point To Point Adapter useful in systems capable of executing application function calls in response to an interrupt according to embodiments of the present invention.

For further explanation, FIG. 3A illustrates an exemplary Point To Point Adapter (180) useful in systems capable of executing application function calls in response to an interrupt according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
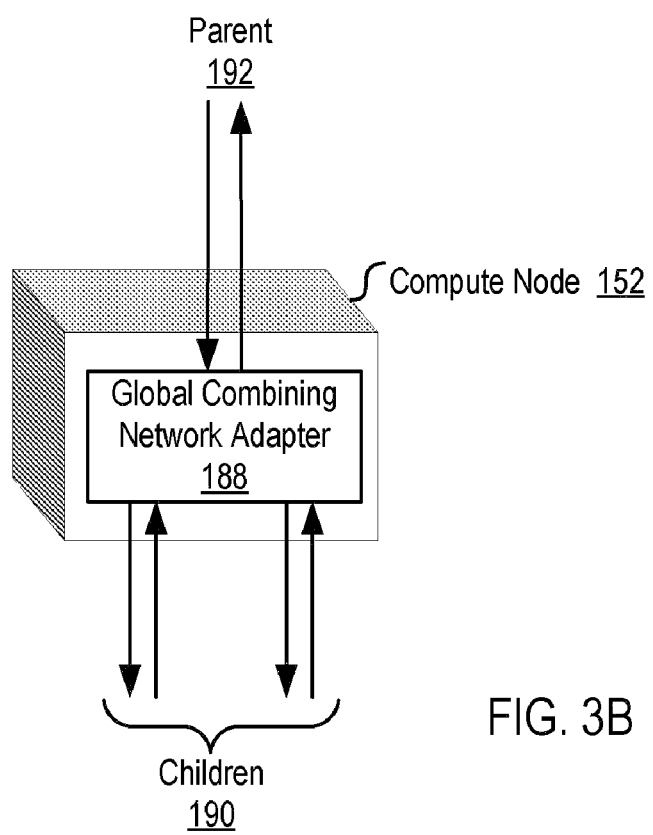
FIG. 3B illustrates an exemplary Global Combining Network Adapter useful in systems capable of executing application function calls in response to an interrupt according to embodiments of the present invention.

For further explanation, FIG. 3B illustrates an exemplary Global Combining Network Adapter (188) useful in systems capable of executing application function calls in response to an interrupt network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
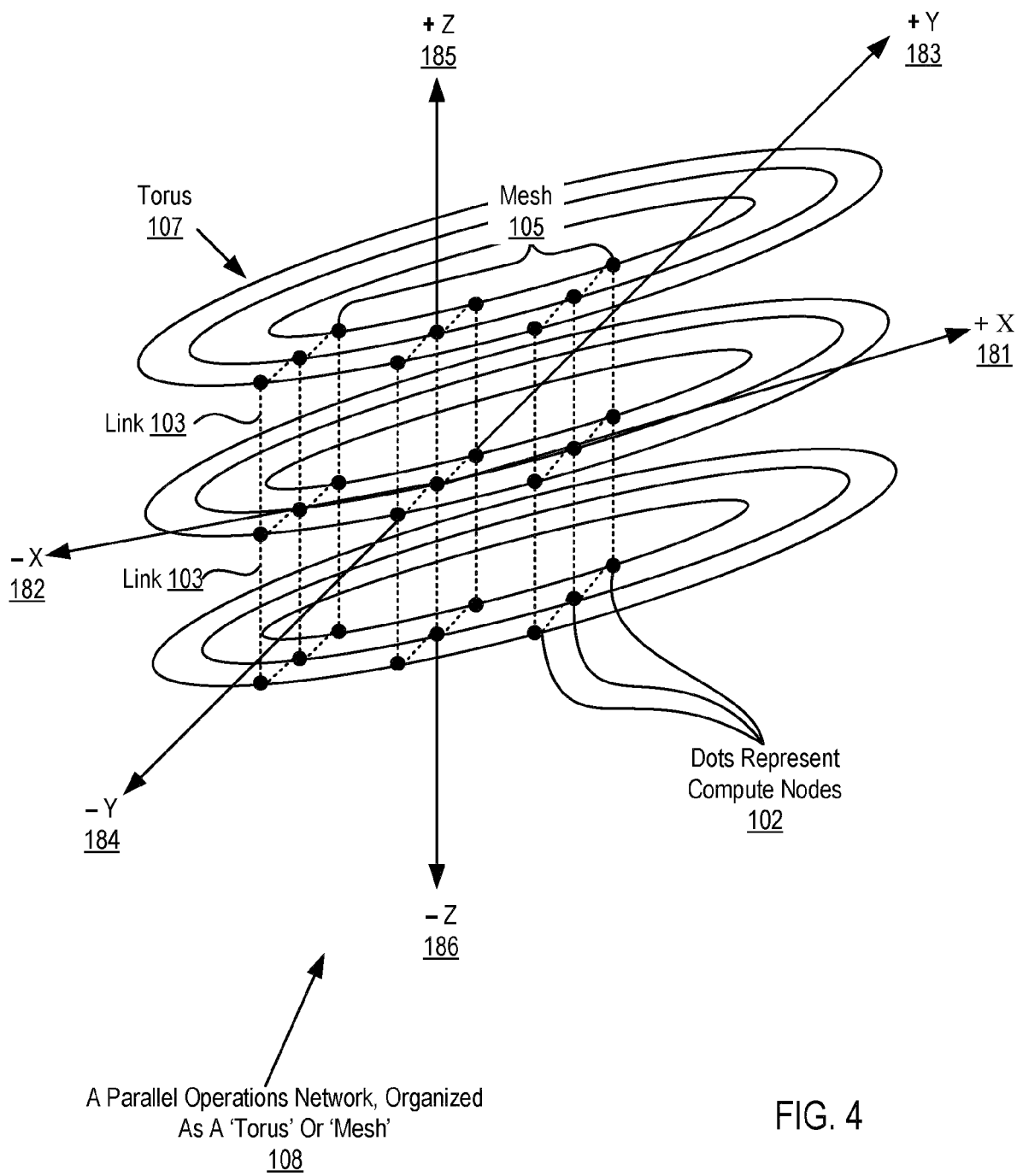
FIG. 4 sets forth a line drawing illustrating an exemplary data communications network optimized for point to point operations useful in systems capable of executing application function calls in response to an interrupt in accordance with embodiments of the present invention.

For further explanation, FIG. 4 sets forth a line drawing illustrating an exemplary data communications network (108) optimized for point to point operations useful in systems capable of executing application function calls in response to an interrupt in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in executing application function calls in response to an interrupt in accordance with embodiments of the present invention may contain only a few compute nodes or may contain thousands of compute nodes.

Figure 5:
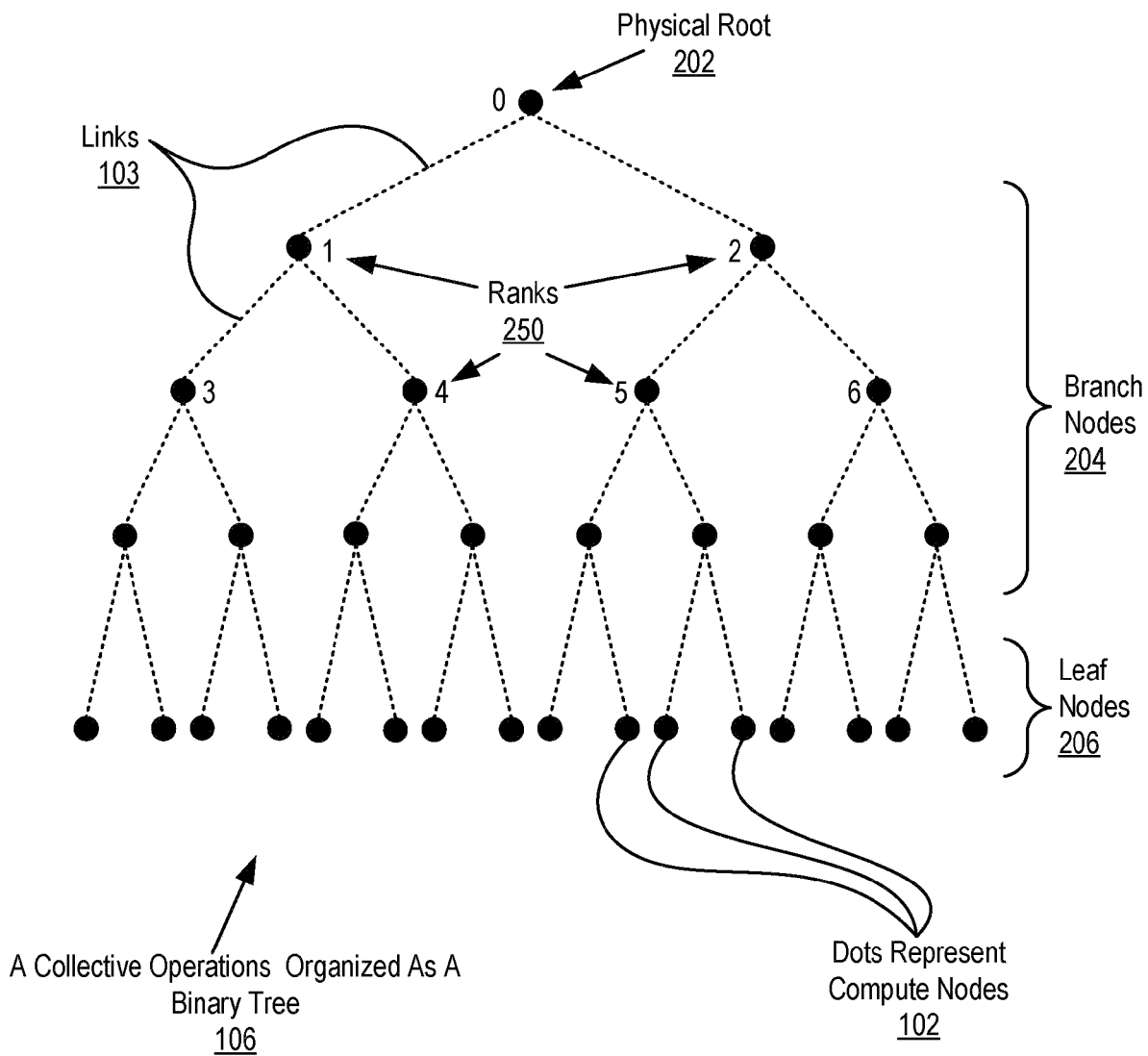
FIG. 5 sets forth a line drawing illustrating an exemplary data communications network optimized for collective operations useful in systems capable of executing application function calls in response to an interrupt in accordance with embodiments of the present invention.

For further explanation, FIG. 5 sets forth a line drawing illustrating an exemplary data communications network (106) optimized for collective operations useful in systems capable of executing application function calls in response to an interrupt in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for executing application function calls in response to an interrupt in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
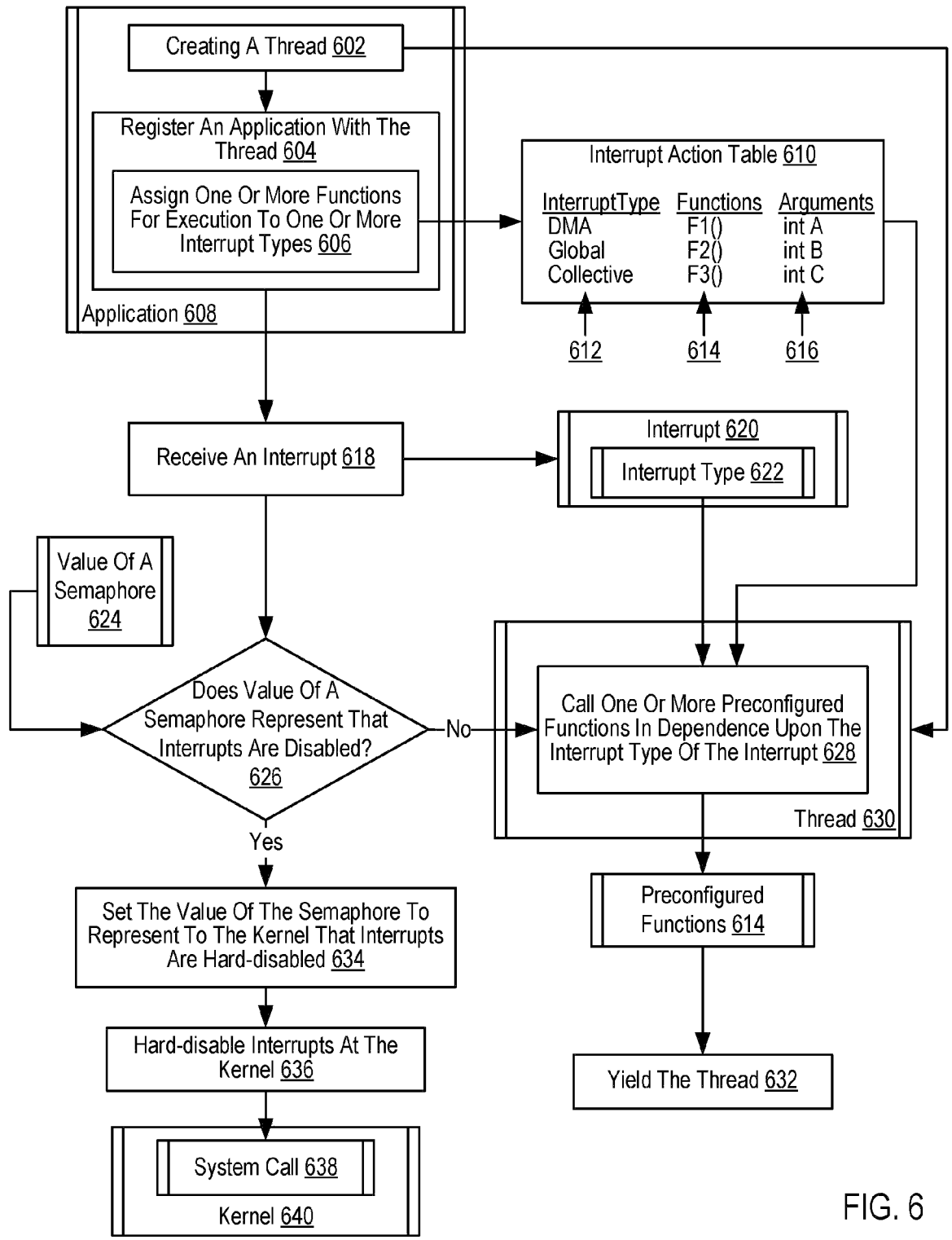
FIG. 6 sets forth a flow chart illustrating an exemplary method for executing application function calls in response to an interrupt according to embodiments of the present invention.

For further explanation, FIG. 6 sets forth a flow chart illustrating an exemplary method for executing application function calls in response to an interrupt according to embodiments of the present invention. The method of FIG. 6 includes creating (602) a thread (630). Creating (602) a thread (630) may be carried out by inserting into a particular register a value representing the thread as an interrupt driven thread and initiating a system call to the kernel to create the thread. In a system that operates according to the Portable Operating System Interface ('POSIX'), for example, a system call to create a thread may be a pthread_create( ) system call. To complete the creation of the thread, the kernel may identify from the value in the particular register that the thread to be created is an interrupt driven thread and the kernel may annotate the thread structures as such.

The method of FIG. 6 also includes registering (604) an application (608) with the thread (630). Registering (604) an application (608) with the thread may be carried out by assigning (606), by the application (608), one or more functions (614) for execution to one or more interrupt types (612). Consider, for example, the table (610) in FIG. 6 that includes several interrupt types (612), each interrupt type assigned to a function (614), and each function associated with an argument (616). In the example of FIG. 6, for example, the function "F1( )" is assigned to the interrupt type "DMA" and is also associated with the argument "int A." Also in the example of FIG. 6, the function "F2( )" is assigned to the interrupt type "Global" and is associated with the argument "int B." Also in the example of FIG. 6, the function "F3( )" is assigned to interrupt type "Collective" and is associated with the argument "int C."

The method of FIG. 6 also includes receiving (618) an interrupt (620) having an interrupt type (622). Receiving (608) an interrupt (620) may be carried out by receiving an interrupt request ('IRQ') from computer hardware. The DMA controller is an example of computer hardware that may send an interrupt request to the kernel (640).

The method of FIG. 6 also includes determining (626) whether a value (624) of a semaphore represents that interrupts are disabled. As explained above, the value of the semaphore may represent one of three things:
That interrupts are not disabled.
That interrupts are disabled.
That interrupts are hard-disabled.

Consider as an example, a system for executing application function calls in response to an interrupt according to embodiments of the present invention that is configured such that a value of a semaphore equal to zero represents that interrupts are not disabled, a value of a semaphore equal to one represents that interrupts are disabled, and a value of a semaphore equal to two represents that interrupts are hard-disabled. In such an exemplary system, determining (626) whether a value (624) of a semaphore represents that interrupts are disabled may be carried out by determining (626) whether the value of the semaphore is equal to one.

The semaphore may be stored in any computer memory accessible by an application. In some embodiments the semaphore may be stored in a memory mapped hardware device called a lockbox. A lockbox enables an application to access data in a memory location mapped to the lockbox through a defined set of atomic locking primitives. Such a lockbox may enable an application to access data in a memory location only to increment, decrement, or read the data for example.

If the value of the semaphore represents that interrupts are not disabled, the method of FIG. 6 continues by calling (628), by the thread (630), one or more preconfigured functions (614) in dependence upon the interrupt type (622) of the interrupt and yielding (632) the thread (630). Calling (628) one or more preconfigured functions (614) in dependence upon the interrupt type (622) of the interrupt may be carried out by identifying in a table associating interrupt types and preconfigured functions, one or more preconfigured functions associated with the interrupt type (622).

Yielding (632) the thread (630) may be carried out by yielding the thread without performing a context switch. Yielding a thread is the termination of the execution of a thread. Typically yielding a thread includes a context switch. As mentioned above a context switch is a computing process that typically includes storing and restoring the state or context of a processor such that multiple processes or threads can share a single processor resource. Such a typical context switch requires a relatively high amount of computational overhead. In such a context switch, for example, all registers associated with the thread are stored for later use and all registers in use prior to the execution of the thread are copied into active memory for use. In contrast to a typical termination of a thread that includes performing a context switch, yielding the thread without performing a context switch in accordance with embodiments of the present invention reduces the amount of computational overhead required to terminate a thread.

If the value (624) of the semaphore represents that interrupts are disabled, the method of FIG. 6 continues by setting (634) the value (624) of the semaphore to represent to a kernel (640) that interrupts are hard-disabled and hard-disabling (636) interrupts at the kernel (640).

Again consider the above example of a system for executing application function calls in response to an interrupt according to embodiments of the present invention that is configured such that a value of a semaphore equal to zero represents that interrupts are not disabled, a value of a semaphore equal to one represents that interrupts are disabled, and a value of a semaphore equal to two represents that interrupts are hard-disabled. In such an exemplary system, setting (634) the value (624) of the semaphore to represent to a kernel (640)

that interrupts are hard-disabled may be carried out by setting the value of the semaphore to three through an atomic operation.

Hard-disabling (636) interrupts at the kernel (640) may be carried out by a system call from the application to the kernel that masks interrupts. Masking an interrupt may be carried out by setting a bit in a bitmask stored in an interrupt mask register ('IMR'). This bitmask used by the kernel to determine whether to ignore an interrupt when an interrupt is received. That is, a hard-disable of interrupts is an instruction to the kernel to ignore any incoming interrupts.

Figure 7:
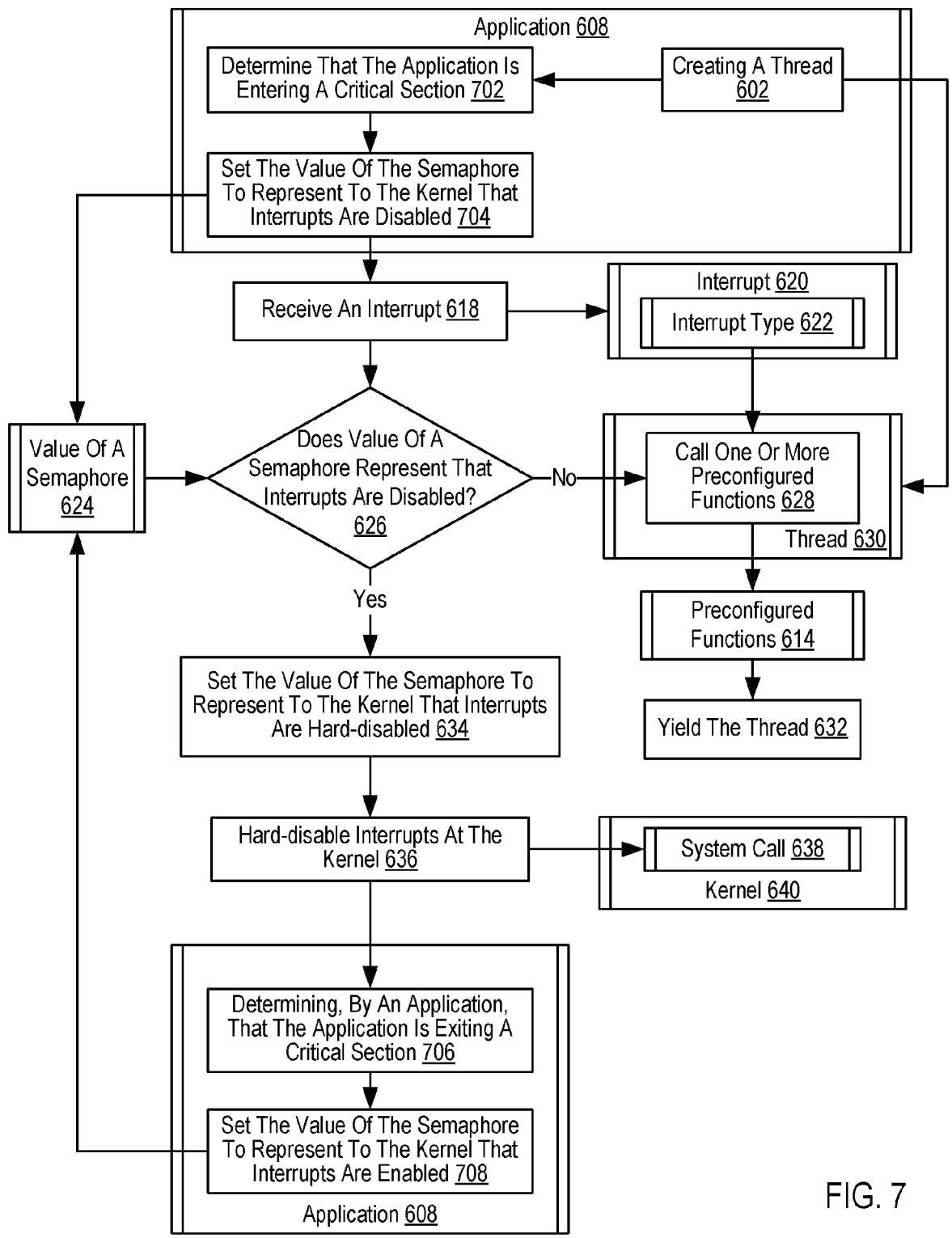
FIG. 7 sets forth a flow chart illustrating a further exemplary method for executing application function calls in response to an interrupt according to embodiments of the present invention.

For further explanation FIG. 7 sets forth a flow chart illustrating a further exemplary method for executing application function calls in response to an interrupt according to embodiments of the present invention. The method of FIG. 7 is similar to the method of FIG. 6 in that the method of FIG. 7 includes creating (602) a thread (630); receiving (618) an interrupt (620); determining (626) whether a value (624) of a semaphore represents that interrupts are disabled; if the value of the semaphore represents that interrupts are not disabled: calling (628) one or more preconfigured functions (614); yielding (632) the thread (630); and if the value of the semaphore represents that interrupts are disabled: setting (634) the value of the semaphore to represent to a kernel (640) that interrupts are hard-disabled; and hard-disabling interrupts at the kernel.

The method of FIG. 7 differs from the method of FIG. 6, however, in that the method of FIG. 6 includes determining (702), by an application (608), that the application (608) is entering a critical section and setting (704) the value (624) of the semaphore to represent to the kernel that interrupts are disabled. Setting (706) the value of the semaphore to represent to the kernel that interrupts are disabled may be carried out by retrieving the value of the semaphore and incrementing the value of the semaphore. Continuing with the exemplary system described above if the application determines that it is entering a critical section the application may set the value of the semaphore to one through an atomic operation that includes retrieving the value and incrementing the value from zero to one.

The method of FIG. 7 also differs from the method of FIG. 6 in that the method of FIG. 6 includes determining (706), by an application (608), that the application (608) is exiting a critical section and setting (708) the value (624) of the semaphore to represent to the kernel that interrupts are enabled. Setting (708) the value (624) of the semaphore to represent to the kernel that interrupts are enabled may include retrieving the value of the semaphore and determining in dependence upon the value of the semaphore whether an interrupt occurred during the execution of the critical section. If the value of the semaphore represents that an interrupt did not occur during the execution of the critical section setting the value of the semaphore may also include decrementing the value of the semaphore. If the value of the semaphore represents that an interrupt did occur during execution of the critical section setting the value of the semaphore may include twice decrementing the value of the semaphore and instructing the kernel to hard-enable interrupts. Hard-enabling interrupts may be carried out by resetting the bit in the bitmask stored in the interrupt mask register.

Exemplary embodiments of the present invention are described largely in the context of a fully functional computer system for executing application function calls in response to an interrupt. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing application function calls in response to an interrupt, the method comprising:
   creating a thread;
   receiving an interrupt having an interrupt type;
   determining whether a value of a semaphore represents that interrupts are disabled;
   if the value of the semaphore represents that interrupts are not disabled:
   calling, by the thread, one or more preconfigured functions in dependence upon the interrupt type of the interrupt;
   yielding the thread; and
   if the value of the semaphore represents that interrupts are disabled:
   setting the value of the semaphore to represent to a kernel that interrupts are hard-disabled; and
   hard-disabling interrupts at the kernel.

2. The method of claim 1 wherein yielding the thread further comprises yielding the thread without performing a context switch.

3. The method of claim 1 further comprising:
   registering an application with the thread including assigning, by the application, one or more functions for execution to one or more interrupt types.

4. The method of claim 1 further comprising:
   determining, by an application, that the application is entering a critical section; and
   setting the value of the semaphore to represent to the kernel that interrupts are disabled.

5. The method of claim 4 wherein setting the value of the semaphore to represent to the kernel that interrupts are disabled further comprises:
   retrieving the value of the semaphore; and
   incrementing the value of the semaphore.

6. The method of claim 1 further comprising:
   determining, by an application, that the application is exiting a critical section; and setting the value of the semaphore to represent to the kernel that interrupts are enabled.

7. The method of claim 6 wherein setting the value of the semaphore to represent to the kernel that interrupts are enabled further comprises:
retrieving the value of the semaphore;
determining in dependence upon the value of the semaphore whether an interrupt occurred during the execution of the critical section;
if the value of the semaphore represents that an interrupt did not occur during the execution of the critical section, decrementing the value of the semaphore; and
if the value of the semaphore represents that an interrupt did occur during execution of the critical section:
twice decrementing the value of the semaphore; and
instructing the kernel to hard-enable interrupts.

8. An apparatus for executing application function calls in response to an interrupt, the apparatus comprising a computer processor, a computer memory operatively coupled to the computer processor, the computer memory having disposed within it computer program instructions capable of:
creating a thread;
receiving an interrupt having an interrupt type;
determining whether a value of a semaphore represents that interrupts are disabled;
if the value of the semaphore represents that interrupts are not disabled:
calling, by the thread, one or more preconfigured functions in dependence upon the interrupt type of the interrupt;
yielding the thread; and
if the value of the semaphore represents that interrupts are disabled:
setting the value of the semaphore to represent to a kernel that interrupts are hard-disabled; and
hard-disabling interrupts at the kernel.

9. The apparatus of claim 8 wherein yielding the thread further comprises yielding the thread without performing a context switch.

10. The apparatus of claim 8 further comprising computer program instructions capable of:
registering an application with the thread including assigning, by the application, one or more functions for execution to one or more interrupt types.

11. The apparatus of claim 8 further comprising computer program instructions capable of:
determining, by an application, that the application is entering a critical section; and
setting the value of the semaphore to represent to the kernel that interrupts are disabled.

12. The apparatus of claim 11 wherein setting the value of the semaphore to represent to the kernel that interrupts are disabled further comprises:
retrieving the value of the semaphore; and
incrementing the value of the semaphore.

13. The apparatus of claim 8 further comprising computer program instructions capable of:
determining, by an application, that the application is exiting a critical section; and
setting the value of the semaphore to represent to the kernel that interrupts are enabled.

14. The apparatus of claim 13 wherein setting the value of the semaphore to represent to the kernel that interrupts are enabled further comprises:
retrieving the value of the semaphore;
determining in dependence upon the value of the semaphore whether an interrupt occurred during the execution of the critical section;
if the value of the semaphore represents that an interrupt did not occur during the execution of the critical section, decrementing the value of the semaphore; and
if the value of the semaphore represents that an interrupt did occur during execution of the critical section:
twice decrementing the value of the semaphore; and
instructing the kernel to hard-enable interrupts.

15. A computer program product for executing application function calls in response to an interrupt, the computer program product disposed in a signal bearing medium, the computer program product comprising computer program instructions capable of:
creating a thread;
receiving an interrupt having an interrupt type;
determining whether a value of a semaphore represents that interrupts are disabled;
if the value of the semaphore represents that interrupts are not disabled:
calling, by the thread, one or more preconfigured functions in dependence upon the interrupt type of the interrupt;
yielding the thread; and
if the value of the semaphore represents that interrupts are disabled:
setting the value of the semaphore to represent to a kernel that interrupts are hard-disabled; and
hard-disabling interrupts at the kernel.

16. The computer program product of claim 15 wherein yielding the thread further comprises yielding the thread without performing a context switch.

17. The computer program product of claim 15 further comprising computer program instructions capable of:
registering an application with the thread including assigning, by the application, one or more functions for execution to one or more interrupt types.

18. The computer program product of claim 15 further comprising computer program instructions capable of:
determining, by an application, that the application is entering a critical section; and
setting the value of the semaphore to represent to the kernel that interrupts are disabled.

19. The computer program product of claim 18 wherein setting the value of the semaphore to represent to the kernel that interrupts are disabled further comprises:
retrieving the value of the semaphore; and
incrementing the value of the semaphore.

20. The computer program product of claim 15 further comprising computer program instructions capable of:
determining, by an application, that the application is exiting a critical section; and
setting the value of the semaphore to represent to the kernel that interrupts are enabled.

* * * * *